US008538795B2

(12) United States Patent
Fell et al.

(10) Patent No.: US 8,538,795 B2
(45) Date of Patent: Sep. 17, 2013

(54) SYSTEM AND METHOD OF DETERMINING A RETAIL COMMODITY PRICE WITHIN A GEOGRAPHIC BOUNDARY

(75) Inventors: Robert M. Fell, Summerland, CA (US); Scott Painter, Bel Air, CA (US); Michael R. Bonsignore, Seattle, WA (US); Brian P. Reed, Southlake, TX (US); Gary A. Magnuson, Corpus Christi, TX (US)

(73) Assignee: Pricelock, Inc., Redwood City, CA (US)

( * ) Notice: Subject to any disclaimer, the term of this patent is extended or adjusted under 35 U.S.C. 154(b) by 661 days.

(21) Appl. No.: 12/030,119

(22) Filed: Feb. 12, 2008

(65) Prior Publication Data
US 2008/0313014 A1      Dec. 18, 2008

Related U.S. Application Data

(60) Provisional application No. 60/900,930, filed on Feb. 12, 2007, provisional application No. 60/966,566, filed on Aug. 29, 2007.

(51) Int. Cl.
*G06Q 30/00* (2012.01)

(52) U.S. Cl.
USPC ......................................................... 705/7.35

(58) Field of Classification Search
USPC ......................................................... 705/7.35
See application file for complete search history.

(56) References Cited

U.S. PATENT DOCUMENTS

| 3,691,527 A | 9/1972 | Yamamoto |
| 3,852,576 A | 12/1974 | Rudd |
| 4,723,212 A | 2/1988 | Mindrum et al. |
| 4,821,186 A | 4/1989 | Munakata et al. |
| 4,825,045 A | 4/1989 | Humble |
| 4,910,672 A | 3/1990 | Off et al. |
| 5,056,019 A | 10/1991 | Schultz et al. |
| 5,173,851 A | 12/1992 | Off et al. |
| 5,200,889 A | 4/1993 | Mori |
| 5,202,826 A | 4/1993 | McCarthy |
| 5,481,094 A | 1/1996 | Suda |

(Continued)

FOREIGN PATENT DOCUMENTS

| AU | 2006100751 A4 | 12/2006 |
| AU | 2007100932 A4 | 10/2007 |

(Continued)

OTHER PUBLICATIONS

TechWeb, "Bargain Hunters Topple AAA Gas-Price Finder," Manhasset, May 27, 2005, p. 1.*

(Continued)

*Primary Examiner* — Nathan Erb
(74) *Attorney, Agent, or Firm* — Sprinkle IP Law Group

(57) ABSTRACT

Disclosed are a method and system for determining a retail price for a commodity within a geographic boundary. Retail prices for the commodity may be obtained from various sources, such as observers, third-party reporting, transactional data, and self-reporting. The retail price for each source may be analyzed to determine a risk factor. The retail prices from all sources associated with a location may be compared to determine a composite retail price for the location. The retail prices for all the locations within the geographic boundary may be analyzed to generate an aggregate composite price for the commodity within the geographic boundary. The analysis may include using a weighted formula. The analysis may include a volume proxy.

19 Claims, 2 Drawing Sheets

(56) References Cited

U.S. PATENT DOCUMENTS

| | | | |
|---|---|---|---|
| 5,521,364 | A | 5/1996 | Kimura et al. |
| 5,612,868 | A | 3/1997 | Off et al. |
| 5,710,887 | A | 1/1998 | Chelliah et al. |
| 5,806,045 | A | 9/1998 | Biorge et al. |
| 5,822,735 | A | 10/1998 | De Lapa et al. |
| 5,862,222 | A | 1/1999 | Gunnarsson |
| 5,873,069 | A | 2/1999 | Reuhl et al. |
| 5,890,137 | A | 3/1999 | Koreeda |
| 6,078,900 | A | 6/2000 | Ettl et al. |
| 6,098,879 | A | 8/2000 | Terranova |
| 6,112,981 | A | 9/2000 | McCall |
| 6,116,505 | A | 9/2000 | Withrow |
| 6,145,741 | A | 11/2000 | Wisdom et al. |
| 6,151,565 | A | 11/2000 | Lobley et al. |
| 6,152,591 | A | 11/2000 | McCall et al. |
| 6,157,871 | A | 12/2000 | Terranova |
| 6,193,155 | B1 | 2/2001 | Walker et al. |
| 6,249,772 | B1 | 6/2001 | Walker et al. |
| 6,298,329 | B1 | 10/2001 | Walker et al. |
| 6,321,984 | B1 | 11/2001 | McCall et al. |
| 6,332,128 | B1 | 12/2001 | Nicholson |
| 6,422,464 | B1 | 7/2002 | Terranova |
| 6,526,277 | B1 | 2/2003 | Zicker et al. |
| 6,594,644 | B1 | 7/2003 | Van Dusen |
| 6,601,033 | B1 | 7/2003 | Sowinski |
| 6,611,811 | B1 | 8/2003 | Deaton |
| 6,637,648 | B1 | 10/2003 | Gilgen et al. |
| 6,732,081 | B2 | 5/2004 | Nicholson |
| 6,741,968 | B2 | 5/2004 | Jacoves et al. |
| 6,741,969 | B1 | 5/2004 | Chen et al. |
| 6,754,636 | B1 | 6/2004 | Walker |
| 6,778,967 | B1 | 8/2004 | Nicholson |
| 6,862,580 | B1 | 3/2005 | Ford |
| 6,862,612 | B1 | 3/2005 | Horn |
| 6,885,996 | B2 | 4/2005 | Nicholson |
| 6,965,872 | B1 | 11/2005 | Grdina |
| 6,980,960 | B2 | 12/2005 | Hajdukiewicz et al. |
| 7,054,837 | B2 | 5/2006 | Hoffman et al. |
| 7,080,026 | B2 | 7/2006 | Singh et al. |
| 7,080,034 | B1 | 7/2006 | Reams |
| 7,092,929 | B1 | 8/2006 | Dvorak et al. |
| 7,162,444 | B1 | 1/2007 | Machado, Jr. et al. |
| 7,188,076 | B2 | 3/2007 | Bensemana |
| 7,343,341 | B2 | 3/2008 | Sandor et al. |
| 7,346,520 | B2 | 3/2008 | Etzioni et al. |
| 7,373,320 | B1 | 5/2008 | McDonough |
| 7,376,580 | B1 | 5/2008 | Walker et al. |
| 7,376,603 | B1 | 5/2008 | Mayr et al. |
| 7,379,890 | B2 | 5/2008 | Myr et al. |
| 7,383,204 | B2 | 6/2008 | McCall et al. |
| 7,437,323 | B1 | 10/2008 | Valkov et al. |
| 7,617,111 | B1 * | 11/2009 | Sheppard et al. ............... 705/1.1 |
| 7,650,109 | B2 * | 1/2010 | Shimakawa et al. ......... 455/2.01 |
| 7,747,500 | B2 | 6/2010 | Hwang et al. |
| 7,945,500 | B2 | 5/2011 | Fell et al. |
| 7,945,501 | B2 | 5/2011 | Fell et al. |
| 8,019,694 | B2 | 9/2011 | Fell et al. |
| 8,065,218 | B2 | 11/2011 | Fell et al. |
| 8,086,517 | B2 | 12/2011 | Fell et al. |
| 8,156,022 | B2 | 4/2012 | Fell et al. |
| 8,160,952 | B1 | 4/2012 | Fell et al. |
| 2001/0039512 | A1 | 11/2001 | Nicholson |
| 2001/0042036 | A1 | 11/2001 | Sanders |
| 2001/0049626 | A1 | 12/2001 | Nicholson |
| 2001/0049651 | A1 | 12/2001 | Selleck |
| 2001/0049668 | A1 | 12/2001 | Wright |
| 2002/0013758 | A1 | 1/2002 | Khaitan |
| 2002/0026403 | A1 | 2/2002 | Tambay et al. |
| 2002/0029171 | A1 | 3/2002 | Senior |
| 2002/0035549 | A1 | 3/2002 | Hagio et al. |
| 2002/0038279 | A1 | 3/2002 | Samuelson et al. |
| 2002/0040321 | A1 | 4/2002 | Nicholson |
| 2002/0052793 | A1 | 5/2002 | Dines et al. |
| 2002/0069155 | A1 | 6/2002 | Nafeh et al. |
| 2002/0073007 | A1 | 6/2002 | Ayache |
| 2002/0107642 | A1 | 8/2002 | Nishida et al. |
| 2002/0120555 | A1 | 8/2002 | Lerner |
| 2002/0138392 | A1 | 9/2002 | LeBlanc |
| 2002/0143616 | A1 | 10/2002 | Hajdukiewicz |
| 2002/0143693 | A1 | 10/2002 | Soestbergen et al. |
| 2002/0161645 | A1 | 10/2002 | Walker et al. |
| 2002/0165809 | A1 | 11/2002 | Gendelman |
| 2002/0194094 | A1 | 12/2002 | Lancaster et al. |
| 2003/0014287 | A1 | 1/2003 | Williams et al. |
| 2003/0018573 | A1 | 1/2003 | Comas et al. |
| 2003/0033154 | A1 | 2/2003 | Hajdukiewicz |
| 2003/0050807 | A1 | 3/2003 | Hoffman et al. |
| 2003/0074267 | A1 | 4/2003 | Acharya et al. |
| 2003/0078787 | A1 | 4/2003 | Hoffman et al. |
| 2003/0088435 | A1 | 5/2003 | King |
| 2003/0088466 | A1 | 5/2003 | Fitzpatrick |
| 2003/0101123 | A1 | 5/2003 | Alvarado et al. |
| 2003/0101125 | A1 | 5/2003 | McGill et al. |
| 2003/0158773 | A1 | 8/2003 | Brunner |
| 2003/0195822 | A1 | 10/2003 | Tatge et al. |
| 2003/0197060 | A1 | 10/2003 | Coyner |
| 2003/0208430 | A1 | 11/2003 | Gershon |
| 2003/0208437 | A1 | 11/2003 | Samuelson |
| 2003/0229571 | A1 | 12/2003 | May |
| 2003/0236738 | A1 | 12/2003 | Lange et al. |
| 2004/0015454 | A1 | 1/2004 | Raines et al. |
| 2004/0024692 | A1 | 2/2004 | Turbeville et al. |
| 2004/0034584 | A1 | 2/2004 | Cory, Sr. et al. |
| 2004/0039684 | A1 | 2/2004 | Sandor |
| 2004/0088179 | A1 | 5/2004 | Cogen et al. |
| 2004/0093298 | A1 | 5/2004 | McClure, III et al. |
| 2004/0103003 | A1 | 5/2004 | Mayers et al. |
| 2004/0111358 | A1 | 6/2004 | Lange et al. |
| 2004/0117291 | A1 | 6/2004 | O'Callahan |
| 2004/0122732 | A1 | 6/2004 | Comer |
| 2004/0122764 | A1 | 6/2004 | Bilski et al. |
| 2004/0128263 | A1 | 7/2004 | Dosanjh |
| 2004/0138927 | A1 | 7/2004 | Eydeland et al. |
| 2004/0148236 | A1 | 7/2004 | Steidlmayer |
| 2004/0148249 | A1 | 7/2004 | Kinnear |
| 2004/0158493 | A1 | 8/2004 | Nicholson |
| 2004/0177019 | A1 | 9/2004 | Slavov et al. |
| 2004/0210478 | A1 | 10/2004 | Pettigrew et al. |
| 2004/0215529 | A1 | 10/2004 | Foster et al. |
| 2004/0230493 | A1 | 11/2004 | Tatge et al. |
| 2004/0230520 | A1 | 11/2004 | Reding et al. |
| 2004/0260613 | A1 | 12/2004 | Mills |
| 2004/0260632 | A1 | 12/2004 | Wanasek |
| 2005/0027650 | A1 | 2/2005 | Walker et al. |
| 2005/0044001 | A1 | 2/2005 | Narayanaswami |
| 2005/0091139 | A1 | 4/2005 | Kumar et al. |
| 2005/0097025 | A1 | 5/2005 | Horton et al. |
| 2005/0114252 | A1 | 5/2005 | Beurskens |
| 2005/0144100 | A1 | 6/2005 | Shapiro et al. |
| 2005/0149402 | A1 | 7/2005 | Nicholson |
| 2005/0154669 | A1 | 7/2005 | Streetman |
| 2005/0159974 | A1 | 7/2005 | Moss et al. |
| 2005/0160006 | A1 | 7/2005 | Pate |
| 2005/0160014 | A1 | 7/2005 | Moss et al. |
| 2005/0182660 | A1 | 8/2005 | Henley |
| 2005/0192711 | A1 | 9/2005 | Raines et al. |
| 2005/0209917 | A1 | 9/2005 | Anderson et al. |
| 2005/0209921 | A1 | 9/2005 | Roberts et al. |
| 2005/0216384 | A1 | 9/2005 | Partlow et al. |
| 2005/0228738 | A1 | 10/2005 | Harris |
| 2005/0228747 | A1 | 10/2005 | Gumport |
| 2005/0240492 | A1 | 10/2005 | Grdina |
| 2005/0261916 | A1 | 11/2005 | McCall |
| 2005/0289021 | A1 * | 12/2005 | Lagergren ..................... 705/28 |
| 2006/0015424 | A1 | 1/2006 | Esposito et al. |
| 2006/0026095 | A1 | 2/2006 | Alvarado et al. |
| 2006/0031123 | A1 | 2/2006 | Leggett et al. |
| 2006/0036530 | A1 | 2/2006 | Shkedy |
| 2006/0080196 | A1 | 4/2006 | Griffin et al. |
| 2006/0080265 | A1 | 4/2006 | Hinds et al. |
| 2006/0085252 | A1 | 4/2006 | Kersenbrock |
| 2006/0095362 | A1 | 5/2006 | Hwang et al. |
| 2006/0155423 | A1 | 7/2006 | Budike |
| 2006/0184445 | A1 | 8/2006 | Sandor et al. |

| | | | |
|---|---|---|---|
| 2006/0190383 A1 | 8/2006 | May | |
| 2006/0190386 A1 | 8/2006 | Levy | |
| 2006/0212384 A1 | 9/2006 | Spurgin et al. | |
| 2006/0212393 A1 | 9/2006 | Brown | |
| 2006/0218056 A1 | 9/2006 | Dickman | |
| 2006/0241951 A1 | 10/2006 | Cynamom et al. | |
| 2006/0293947 A1 | 12/2006 | Nicholson | |
| 2006/0293952 A1 | 12/2006 | Nicholson | |
| 2006/0293953 A1 | 12/2006 | Nicholson | |
| 2006/0293980 A1 | 12/2006 | Corby et al. | |
| 2007/0016502 A1 | 1/2007 | Williamson et al. | |
| 2007/0032941 A1 | 2/2007 | Allen | |
| 2007/0038553 A1 | 2/2007 | Miller et al. | |
| 2007/0061174 A1* | 3/2007 | Phillips ......................... | 705/5 |
| 2007/0061220 A1 | 3/2007 | Vaid | |
| 2007/0095890 A1 | 5/2007 | Elefant | |
| 2007/0106559 A1 | 5/2007 | Harrell | |
| 2007/0195486 A1 | 8/2007 | Paul et al. | |
| 2007/0198385 A1 | 8/2007 | McGill et al. | |
| 2007/0203793 A1 | 8/2007 | Hajdukiewicz et al. | |
| 2007/0203794 A1 | 8/2007 | Hajdukiewicz et al. | |
| 2007/0233616 A1 | 10/2007 | Richards et al. | |
| 2007/0255457 A1 | 11/2007 | Whitcomb et al. | |
| 2007/0267479 A1 | 11/2007 | Nix et al. | |
| 2007/0267482 A1 | 11/2007 | Ruckart et al. | |
| 2007/0276738 A1 | 11/2007 | Rajunas, III | |
| 2007/0288312 A1 | 12/2007 | Wang | |
| 2007/0294159 A1 | 12/2007 | Cottleq | |
| 2008/0005008 A1 | 1/2008 | Alvarado et al. | |
| 2008/0015964 A1 | 1/2008 | Shuster | |
| 2008/0015976 A1 | 1/2008 | Sandor et al. | |
| 2008/0015981 A1 | 1/2008 | Danesh | |
| 2008/0027737 A1 | 1/2008 | Watkins | |
| 2008/0033833 A1 | 2/2008 | Senior | |
| 2008/0080682 A1 | 4/2008 | Ogunwale et al. | |
| 2008/0097877 A1 | 4/2008 | Rahal | |
| 2008/0097888 A1 | 4/2008 | Sugihara | |
| 2008/0114622 A1 | 5/2008 | Crean et al. | |
| 2008/0126208 A1 | 5/2008 | Nicholson et al. | |
| 2008/0133430 A1 | 6/2008 | Horowitz | |
| 2008/0243663 A1 | 10/2008 | Eveland | |
| 2009/0198621 A1 | 8/2009 | Schneier et al. | |
| 2009/0204316 A1 | 8/2009 | Klampfl et al. | |
| 2010/0042488 A1 | 2/2010 | McClung, III | |

FOREIGN PATENT DOCUMENTS

| | | |
|---|---|---|
| CA | 2070736 | 12/1992 |
| CA | 2217739 A1 | 4/1996 |
| CA | 2340966 A1 | 9/2001 |
| JP | 2217998 A | 8/1990 |
| JP | 04373069 A | 12/1992 |
| JP | 10111985 A | 4/1998 |
| JP | 2002063347 A | 2/2002 |
| JP | 2002215640 A | 8/2002 |
| JP | 2003108850 A | 4/2003 |
| JP | 2003128198 A | 5/2003 |
| JP | 2003233743 A | 8/2003 |
| JP | 2004145534 A1 | 5/2004 |
| JP | 2004252569 A | 9/2004 |
| JP | 2004318422 A | 11/2004 |
| JP | 2005122766 A | 5/2005 |
| JP | 2005135347 A | 5/2005 |
| JP | 2006335438 A | 12/2006 |
| JP | 2007122592 A | 5/2007 |
| JP | 2007249410 A | 9/2007 |
| WO | WO 9118373 A1 | 11/1991 |
| WO | WO 9214213 | 8/1992 |
| WO | WO 9301466 A1 | 1/1993 |
| WO | WO 9309398 A1 | 5/1993 |
| WO | WO 9606415 | 2/1996 |
| WO | WO 9706250 | 2/1997 |
| WO | WO 9818053 A1 | 4/1998 |
| WO | WO 9835490 A1 | 8/1998 |
| WO | WO 0003022 A2 | 1/2000 |
| WO | WO 0104327 | 1/2001 |
| WO | WO 0125875 A2 | 4/2001 |
| WO | WO 0125989 A1 | 4/2001 |
| WO | WO 0126000 A1 | 4/2001 |
| WO | WO 0126003 A1 | 4/2001 |
| WO | WO 0155885 A2 | 8/2001 |
| WO | WO 0161671 A | 8/2001 |
| WO | WO 0177961 A1 | 10/2001 |
| WO | WO 0188743 A2 | 11/2001 |
| WO | WO 0195225 A1 | 12/2001 |
| WO | WO 0211018 A1 | 2/2002 |
| WO | WO 0212113 A1 | 2/2002 |
| WO | WO 0213091 A1 | 2/2002 |
| WO | WO 0217193 A1 | 2/2002 |
| WO | WO 0233621 A1 | 4/2002 |
| WO | WO 0233635 A1 | 4/2002 |
| WO | WO 0233636 A1 | 4/2002 |
| WO | WO 0233637 A1 | 4/2002 |
| WO | WO 0241120 A2 | 5/2002 |
| WO | WO 0244847 A2 | 6/2002 |
| WO | WO 02061663 A2 | 8/2002 |
| WO | WO 02069109 A2 | 9/2002 |
| WO | WO 02069110 A2 | 9/2002 |
| WO | WO 02075485 A2 | 9/2002 |
| WO | WO 02075488 A2 | 9/2002 |
| WO | WO 02079923 A2 | 10/2002 |
| WO | WO 02079940 A2 | 10/2002 |
| WO | WO 02080041 A1 | 10/2002 |
| WO | WO 02088888 A2 | 11/2002 |
| WO | WO 02088906 A2 | 11/2002 |
| WO | WO 02093302 A2 | 11/2002 |
| WO | WO 02093328 A2 | 11/2002 |
| WO | WO 02098045 A2 | 12/2002 |
| WO | WO 02099589 A2 | 12/2002 |
| WO | WO 02099601 A2 | 12/2002 |
| WO | WO 02103487 A2 | 12/2002 |
| WO | WO 02103489 A2 | 12/2002 |
| WO | WO 03003150 A2 | 1/2003 |
| WO | WO 03012584 A2 | 2/2003 |
| WO | WO 03012585 A2 | 2/2003 |
| WO | WO 03012586 A2 | 2/2003 |
| WO | WO 03012589 A2 | 2/2003 |
| WO | WO 03032112 A2 | 4/2003 |
| WO | WO 03036432 A2 | 5/2003 |
| WO | WO 03036466 A1 | 5/2003 |
| WO | WO 03038375 A1 | 5/2003 |
| WO | WO 03038547 A2 | 5/2003 |
| WO | WO 03038651 A1 | 5/2003 |
| WO | WO 03038675 A1 | 5/2003 |
| WO | WO 03038676 A1 | 5/2003 |
| WO | WO 03053124 A2 | 7/2003 |
| WO | WO 03062738 A2 | 7/2003 |
| WO | WO 03065278 A1 | 8/2003 |
| WO | WO 03069433 A2 | 8/2003 |
| WO | WO 03069840 A1 | 8/2003 |
| WO | WO 03077054 A2 | 9/2003 |
| WO | WO 03079214 A1 | 9/2003 |
| WO | WO 03087708 A1 | 10/2003 |
| WO | WO 03098516 A1 | 11/2003 |
| WO | WO 03104938 A2 | 12/2003 |
| WO | WO 03104944 A2 | 12/2003 |
| WO | WO 03105054 A1 | 12/2003 |
| WO | WO 04001537 A2 | 12/2003 |
| WO | WO 04001538 A2 | 12/2003 |
| WO | WO 04001544 A2 | 12/2003 |
| WO | WO 2004003699 A2 | 1/2004 |
| WO | WO 2004003811 A1 | 1/2004 |
| WO | WO 2004010262 A2 | 1/2004 |
| WO | WO 2004021102 A2 | 3/2004 |
| WO | WO 2004029781 A2 | 4/2004 |
| WO | WO 2004046989 A1 | 6/2004 |
| WO | WO 2004047082 A2 | 6/2004 |
| WO | WO 2004/059547 A1 * | 7/2004 |
| WO | WO 2004061596 A2 | 7/2004 |
| WO | WO 2004061785 A2 | 7/2004 |
| WO | WO 2004072778 A2 | 8/2004 |
| WO | WO 2004072803 A2 | 8/2004 |
| WO | WO 2004077256 A2 | 9/2004 |
| WO | WO 2004084028 A2 | 9/2004 |
| WO | WO 2004084046 A2 | 9/2004 |
| WO | WO 2005057458 A1 | 6/2005 |
| WO | WO 2005065131 A2 | 7/2005 |
| WO | WO 2005069871 A2 | 8/2005 |
| WO | WO 2005101996 A2 | 11/2005 |

| | | |
|---|---|---|
| WO | WO 2006049779 A1 | 5/2006 |
| WO | WO2006055117 A2 | 5/2006 |
| WO | WO 2006083709 A2 | 8/2006 |
| WO | WO 2006110121 A1 | 10/2006 |
| WO | WO 2007002065 A2 | 1/2007 |
| WO | WO2007004443 A2 | 4/2007 |
| WO | WO2007059165 A1 | 5/2007 |
| WO | WO2007079228 A2 | 7/2007 |

OTHER PUBLICATIONS

Shanley, Will, "Drivers Can Use the Internet to Find Cheap Gasoline," Knight Ridder Tribune Business News, Washington, May 26, 2005, p. 1.*

Day to Day, "Using the Internet to Search for Cheap Gas," Los Angeles, Apr. 27, 2006, p. 1.*

Maunsell, Nevill Boyd, "City View: Savers and Borrowers Hang on to Shares," Birmingham Post, Post Edition, Birmingham (UK), Nov. 30, 2000, p. 21.*

International Preliminary Report on Patentability for PCT Application No. PCT/US2008/059633, issued Oct. 13, 2009, mailed Oct. 22, 2009, 6 pgs.

International Preliminary Report on Patentability for PCT Application No. PCT/US2008/059619, issued Oct. 13, 2009, mailed Oct. 22, 2009, 6 pgs.

International Preliminary Report on Patentability for PCT Application No. PCT/US2008/059609, issued Oct. 13, 2009, mailed Oct. 22, 2009, 6 pgs.

International Preliminary Report on Patentability for PCT Application No. PCT/US2008/059614, issued Oct. 13, 2009, mailed Oct. 22, 2009, 4 pgs.

Final Office Action issued for U.S. Appl. No. 12/030,073 mailed on Nov. 24, 2009, 12 pgs.

Office Action issued for U.S. Appl. No. 12/370,430 mailed on Jan. 20, 2010, 14 pgs.

Office Action issued for U.S. Appl. No. 11/705,571 mailed on Apr. 23, 2010, 16 pgs.

Office Action issued for U.S. Appl. No. 12/099,237 mailed May 21, 2010, 8 pgs.

Office Action issued for U.S. Appl. No. 12/099,253 mailed May 25, 2010, 9 pgs.

Office Action issued for U.S. Appl. No. 12/099,224 mailed May 26, 2010, 7 pgs.

Office Action issued for U.S. Appl. No. 12/029,961 mailed Jun. 23, 2010, 13 pgs.

Office Action issued for U.S. Appl. No. 12/370,430 mailed Jul. 7, 2010, 13 pgs.

GasLimit "Frequently Asked Questions", 2 pages, obtained from http://www.gaslimit.com/faq on Jan. 2, 2008.

GasLimit "Current Gas Prices", 2 pages, obtained from http://www.gaslimit.com/current-gas-prices.php on Jan. 2, 2008.

GasLimit "Terms and Conditions", 4 pages, obtained from http://www.gaslimit.com/terms_and_condition on Jan. 2, 2008.

GasLimit "Quote Steps 1-5", 5 pages, obtained from http://www.gaslimit.com/legacy on Jan. 2, 2008.

GasLimit "Gas Cap Cancellation Information", 1 page, obtained from http://www.gaslimit.com/cancel_info on Jan. 2, 2008.

"Price Changes in the Gasoline Market: Are Midwestern Gasoline Prices Downward Sticky?", Energy Information Administration, Wash., DC; DOE/EIA-0626, pp. i-55, Feb. 1999.

Jacobson, S. "Recognizing Embedded Risks in Energy", 4 pages, downloaded from http://www.derivativesstrategy.com/magazine/archive/1999/1299co14.asp on Jan. 11, 2008.

Gordon, et al. Modelling Farm-Retail Price Linkage for Eight Agricultural Commodities (Technical Report #1/96), 65 pgs, Dept. of Econ, Univ. of Canada & Auckland, Nov. 1996.

Ervin, S., "Commodity Futures Modernization Act of 2000: A Practical Look at the Law that Revolutionized Derivatives Law and Regulation," 6 pages, Copyright 2001 Dechert.

Commodity Futures Trading Commission, Order, DOCID: fr21mr03-45; Federal Register, Notices, vol. 68, No. 55, pp. 1-6, Mar. 21, 2003, obtained from <<wais.access.gpo.gov>>.

"Congress Makes Changes to the Regulation of Futures and Derivatives Transactions", Publications/McDermott Newsletters, McDermott Will and Emery, 10 pages, Jan. 2001.

Marsh, J., 'Regulation of "Specialist Commodity Dealers" in the United States, Hunton & Williams, London, England, 10 pages, Oct. 19, 2005, obtained from <<www.hunton.com>>.

Request for Continued Examination, Extension of Time and Amendment as filed with U.S. Patent Office on Oct. 6, 2006 in U.S. Appl. No. 09/853,196; 17 pages.

Office Action mailed from U.S. Patent Office on Dec. 13, 2006 in U.S. Appl. No. 09/805,950; 11 pages.

Office Action mailed from U.S. Patent Office on Dec. 15, 2006 in U.S. Appl. No. 09/853,196; 11 pages.

Asplund, M., et al. "Price Adjustments by a Gasoline Retail Chain", Scand. J. of Economics 102(1), 101-121, 2000.

Fischer, A., "Weather futures 'bet' will give Tucson firms a hedge against losses," Arizona Daily Star, Tucson, Arizona, Feb. 5, 1999, 3 pages.

Fuel Bank: lock in your price for gasoline, obtained from http://www.fuelbank.com on May 19, 2008, 1 page.

Tommelleo, D., "Priceline.Com plans to let Customers set Prices for Gasoline", The Augusta Chronicle, Augusta, Georgia, Feb. 26, 2000, 2 pages.

Skyline Products: Central Control Fuel Pricing Software, obtained from http://skylineproducts.com on Feb. 10, 2007, 3 pages.

PCT/US2008/053686, International Search Report and Written Opinion mailed Jun. 5, 2008.

PCT/US2008/053669, International Search Report and Written Opinion mailed Jun. 5, 2008.

PCT/US2008/053676, International Search Report and Written Opinion mailed Jun. 5, 2008.

PCT/US2008/053674, International Search Report and Written Opinion mailed Jun. 5, 2008.

PCT/US2008/053687, International Search Report and Written Opinion mailed Jun. 5, 2008.

Chao, et al. "Restructured Electricity Markets: A Risk Management Approach", [Retrieved online from URL:http://www.ieor.berkeley.edu], presented Jul. 1, 2005, 36 pages.

PCT/US2008/053724, International Search Report and Written Opinion mailed Jun. 5, 2008.

PCT/US2008/053695, International Search Report and Written Opinion mailed Jun. 5, 2008.

PCT/US2008/59633, International Search Report and Written Opinion mailed Jul. 8, 2008.

PCT/US2008/059609, International Search Report and Written Opinion mailed Jul. 1, 2008.

PCT/US2008/053699, International Search Report and Written Opinion mailed Jun. 27, 2008.

PCT/US2008/059619, International Search Report and Written Opinion mailed Aug. 15, 2008.

PCT/US2008/059614, International Search Report and Written Opinion mailed Aug. 25, 2008.

Office Action issued for U.S. Appl. No. 12/030,073, mailed on May 1, 2009, 11 pgs.

Office Action issued for U.S. Appl. No. 11/705,571, mailed on Aug. 14, 2009, 13 pgs.

International Preliminary Report on Patentability for PCT Application No. PCT/US2008/053669, mailed Aug. 27, 2009, issued Aug. 19, 2009, 9 pgs.

International Preliminary Report on Patentability for PCT Application No. PCT/US2008/053676, mailed Aug. 27, 2009, issued Aug. 19, 2009, 6 pgs.

International Preliminary Report on Patentability for PCT Application No. PCT/US2008/053674, mailed Aug. 27, 2009, issued Aug. 19, 2009, 7 pgs.

International Preliminary Report on Patentability for PCT Application No. PCT/US2008/053686, mailed Aug. 27, 2009, issued Aug. 19, 2009, 6 pgs.

International Preliminary Report on Patentability for PCT Application No. CT/US2008/053687, mailed Aug. 27, 2009, issued Aug. 19, 2009, 6 pgs.

International Preliminary Report on Patentability for PCT Application No. PCT/US2008/053695, mailed Aug. 27, 2009, issued Aug. 19, 2009, 5 pgs.
International Preliminary Report on Patentability for PCT Application No. PCT/US2008/053699, mailed Aug. 27, 2009, issued Aug. 19, 2009, 5 pgs.
International Preliminary Report on Patentability for PCT Application No. PCT/US2008/053724, mailed Aug. 27, 2009, issued Aug. 19, 2009, 6 pgs.
Office Action issued for U.S. Appl. No. 12/030,012, mailed Jul. 22, 2010, 12 pgs.
Office Action issued for U.S. Appl. No. 12/099,209, mailed Aug. 3, 2010, 17 pgs.
Office Action issued for U.S. Appl. No. 12/030,032, mailed Sep. 28, 2010, 9 pgs.
Office Action issued for U.S. Appl. No. 12/370,395, mailed Oct. 7, 2010, 11 pgs.
Office Action issued for U.S. Appl. No. 12/099,253 mailed Oct. 26, 2010, 10 pgs.
Office Action issued for U.S. Appl. No. 12/099,237, mailed on Nov. 10, 2010, 7 pgs.
Office Action issued for U.S. Appl. No. 12/030,086, mailed on Dec. 21, 2010, 13 pgs.
Liu, Lon-Mu, "Dynamic Relationship Analysis of US Gasoline and Crude Oil Prices," Journal of Forecasting, Sep. 1991, p. 521-547. (27 pgs.).
John M. Barron, Beck A. Taylor and John R. Umbeck, "Will Open Supply Lower Retail Gasoline Prices?" Contemporary Economic Policy, Jan. 2004, pp. 63-77. (15 pgs.).
Franklin R. Edwards and Michael S. Carter, "The Collapse of Metallgesellschaft: Unhedgeable Risks, Poor Hedging Strategy, or Just Bad Luck?" The Journal of Futures Markets, May 1995, p. 211. (54 pgs.).
Office Action issued for U.S. Appl. No. 12/029,961, mailed on Nov. 17, 2010, 15 pgs.
Office Action issued for U.S. Appl. No. 12/030,041, mailed on Nov. 16, 2010, 14 pgs.
Office Action issued for U.S. Appl. No. 12/370,430, mailed on Jan. 13, 2011, 15 pgs.
Office Action issued for U.S. Appl. No. 12/099,209, mailed on Jan. 20, 2011, 19 pgs.
Skyline Products Inc. Press Release: Skyline Products Partners with Excentus to Offer a Certified Fuel Pricing Integration for High-Volume Retailers, 1 page.
Supplemental Notice of Allowance for U.S. Appl. No. 12/370,430, mailed Feb. 16, 2012, 13 pages.
Office Action for U.S. Appl. No. 12/030,041, mailed on Apr. 12, 2011, 19 pgs.
Office Action for U.S. Appl. No. 12/370,395, mailed on Apr. 13, 2011, 12 pgs.
Office Action issued for U.S. Appl. No. 13/210,602, mailed May 23, 2012, 12 pages.
A. Michael Schaal, "New Power Plant Project Trends," Power Engineering, Barrington, Sep. 2002, vol. 106, Issue 9, p. 12, 3 pages.
Office Action issued for U.S. Appl. No. 12/029,961, mailed May 12, 2011, 14 pgs.
Office Action issued for U.S. Appl. No. 12/030,032, mailed May 23, 2011, 10 pgs.
Office Action issued for U.S. Appl. No. 13/076,567, mailed May 24, 2011, 6 pgs.
Office Action issued for U.S. Appl. No. 13/076,741, mailed May 24, 2011, 6 pgs.
Final Office Action issued for U.S. Appl. No. 12/370,430, mailed Jun. 1, 2011, 16 pgs.
Office Action issued for U.S. Appl. No. 13/210,602, mailed Oct. 11, 2011, 7 pgs.
Office Action issued for U.S. Appl. No. 12/099,224, mailed on Nov. 12, 2010, 8 pgs.
Office Action issued for U.S. Appl. No. 11/705,571, mailed on Jan. 26, 2011, 20 pgs.
Roger G. Clarke, "Options and Futures: A Tutorial," The Research Foundation of the Institute of Chartered Financial Analysis, Dec. 1992/Rev. Aug. 1996, 46 pgs.
Phil Shook, "Futures Trading: The Fine Art of Managing Risk, or Shooting," NPN, National Petroleum News, Chicago: Feb. 1992, vol. 84, Issue 2, p. 37, 7 pgs.
Notice of Allowance issued for U.S. Appl. No. 12/099,224, mailed on Mar. 1, 2011, 5 pgs.
Notice of Allowance issued for U.S. Appl. No. 12/099,237, mailed on Mar. 3, 2011, 5 pgs.
"Locked-in rates for heating oil burn consumers," David Dishneau Associated Press, Journal—Gazette, Ft. Wayne, Inc. Oct. 11, 2006, 3 pgs.
"Fuel hardy as gas and oil prices rise, shoppers can place a premium on the pennies they save by using their heads at the pump," Kristen Andresen, Bangor Daily News, Bangor, ME, Oct. 1, 2005, 3 pgs.
Final Office Action issued for U.S. Appl. No. 11/705,571 mailed on Jul. 13, 2011, 11 pgs.
Notice of Allowance issued for U.S. Appl. No. 12/030,086, mailed Jul. 26, 2011, 14 pgs.
Office Action issued for U.S. Appl. No. 12/099,253, mailed Aug. 29, 2011, 12 pgs.
Final Office Action issued for U.S. Appl. No. 12/029,961, mailed Nov. 21, 2011, 22 pgs.
Notice of Allowance issued for U.S. Appl. No. 12/370,430, mailed Jan. 26, 2012, 15 pages.
Notice of Allowance issued for U.S. Appl. No. 11/705,571, mailed Dec. 22, 2011, 8 pages.
Office Action issued for U.S. Appl. No. 12/370,395, mailed Dec. 30, 2011, 10 pages.
Final Office Action issued for U.S. Appl. No. 12/099,253, mailed Jan. 9, 2012, 22 pages.
Office Action issued in U.S. Appl. No. 13/210,602, mailed Sep. 21, 2012, 13 pages.
Wong, G., "Crude Oil Prices Slip Ahead of U.S. Fuel Data Expected to Show Stocks Raise," Daily Bulletin, Final Edition, May 10, 2006, pp. 7-7.

* cited by examiner

SYSTEM AND METHOD OF DETERMINING A RETAIL COMMODITY PRICE WITHIN A GEOGRAPHIC BOUNDARY

CROSS-REFERENCE TO RELATED APPLICATIONS

This application claims priority from Provisional Patent Application No. 60/900,930, filed Feb. 12, 2007, entitled "SYSTEM AND METHOD OF DETERMINING A RETAIL COMMODITY PRICE WITHIN A GEOGRAPHIC BOUNDARY," and Provisional Patent Application No. 60/966,566, filed Aug. 29, 2007, entitled "SYSTEM AND METHOD OF DETERMINING A RETAIL COMMODITY PRICE WITHIN A GEOGRAPHIC BOUNDARY," the entire contents of which are hereby expressly incorporated by reference for all purposes.

FIELD OF THE INVENTION

The present invention relates generally to pricing retail commodities. More particularly, the present invention relates to a system and method for determining a retail price for a commodity within a geographic boundary.

SUMMARY OF THE INVENTION

Within this disclosure, the term "commodity" refers to an article of commerce—an item that can be bought and sold freely on a market. It may be a product which trades on a commodity exchange or spot market and which may fall into one of several categories, including energy, food, grains, and metals. Currently, commodities that can be traded on a commodity exchange include, but are not limited to, crude oil, light crude oil, natural gas, heating oil, gasoline, propane, ethanol, electricity, uranium, lean hogs, pork bellies, live cattle, feeder cattle, wheat, corn, soybeans, oats, rice, cocoa, coffee, cotton, sugar, gold, silver, platinum, copper, lead, zinc, tin, aluminum, titanium, nickel, steel, rubber, wool, polypropylene, and so on. Note that a commodity can refer to tangible things as well as more ephemeral products. Foreign currencies and financial indexes are examples of the latter. For example, positions in the Goldman Sachs Commodity Index (GSCI) and the Reuters Jefferies Consumer Research Board Index (RJCRB Index) can be traded as a commodity. What matters is that something be exchanged for the thing. New York Mercantile Exchange (NYMEX) and Chicago Mercantile Exchange (CME) are examples of a commodity exchange. Other commodities exchanges also exist and are known to those skilled in the art.

In a simplified sense, commodities are goods or products with relative homogeneousness that have value and that are produced in large quantities by many different producers; the goods or products from each different producer are considered equivalent. Commoditization occurs as a goods or products market loses differentiation across its supply base. As such, items that used to carry premium margins for market participants have become commodities, of which crude oil is an example. However, a commodity generally has a definable quality or meets a standard so that all parties trading in the market will know what is being traded. In the case of crude oil, each of the hundreds of grades of fuel oil may be defined. For example, West Texas Intermediate (WTI), North Sea Brent Crude, etc. refer to grades of crude oil that meet selected standards such as sulfur content, specific gravity, etc., so that all parties involved in trading crude oil know the qualities of the crude oil being traded. Motor fuels such as gasoline represent examples of energy-related commodities that may meet standardized definitions. Thus, gasoline with an octane grade of 87 may be a commodity and gasoline with an octane grade of 93 may also be a commodity, and they may demand different prices because the two are not identical—even though they may be related. Those skilled in the art will appreciate that other commodities may have other ways to define a quality. Other energy-related commodities that may have a definable quality or that meet a standard include, but are not limited to, diesel fuel, heating oils, aviation fuel, and emission credits. Diesel fuels may generally be classified according to seven grades based in part on sulfur content, emission credits may be classified based on sulfur or carbon content, etc.

Historically, risk is the reason exchange trading of commodities began. For example, because a farmer does not know what the selling price will be for his crop, he risks the margin between the cost of producing the crop and the price he achieves in the market. In some cases, investors can buy or sell commodities in bulk through futures contracts. The price of a commodity is subject to supply and demand.

A commodity may refer to a retail commodity that can be purchased by a consuming public and not necessarily the wholesale market only. One skilled in the art will recognize that embodiments disclosed herein may provide means and mechanisms through which commodities that currently can only be traded on the wholesale level may be made available to retail level for retail consumption by the public. One way to achieve this is to bring technologies that were once the private reserves of the major trading houses and global energy firms down to the consumer level and provide tools that are applicable and useful to the retail consumer so they can mitigate and/or manage their measurable risks involved in buying/selling their commodities. One example of an energy related retail commodity is motor fuels, which may include various grades of gasoline. For example, motor fuels may include 87 octane grade gasoline, 93 octane grade gasoline, etc as well as various grades of diesel fuels. Other examples of an energy related retail commodity could be jet fuel, heating oils, electricity or emission credits such as carbon offsets. Other retail commodities are possible and/or anticipated.

While a retail commodity and a wholesale commodity may refer to the same underlying good, they are associated with risks that can be measured and handled differently. One reason is that, while wholesale commodities generally involve sales of large quantities, retail commodities may involve much smaller transaction volumes and relate much more closely to how and where a good is consumed. The risks associated with a retail commodity therefore may be affected by local supply and demand and perhaps different factors. Within the context of this disclosure, there is a definable relationship between a retail commodity and the exposure of risks to the consumer. This retail level of the exposure of risks may correlate to the size and the specificity of the transaction in which the retail commodity is traded. Other factors may include the granularity of the geographic market where the transaction takes place, and so on. For example, the demand for heating oil No. 2 in January may be significantly different in the Boston market than in the Miami market.

Pricing a retail commodity can be a very tricky process, particularly in a crowded market. For example, if there are multiple gas stations in one particular area or within a geographic boundary (e.g., a city, a county, etc.), each gas station would want to entice as many customers as possible with competitive fuel prices while maximizing its profits on selling the fuels.

Pricing a retail commodity can be a very difficult process, particularly if that commodity tends to fluctuate in an unpredictable manner. For example, as the price of crude oil continues to fluctuate globally and fluidly, fuel prices at the pump can change from location to location, and on a daily or even hourly basis.

Other factors such as disparity and inconsistency among retailers can also contribute to the extreme difficulty in pricing a retail commodity. As an example, according to the National Association of Convenience Stores in Alexandria, Va., convenience stores sell nearly 80 percent of the gasoline in the United States, and only a few percent are owned by the oil companies. The makeup of the convenience stores industry is very diverse and fragmented.

Further complicating the idea of pricing a commodity such as retail motor fuels such as gasoline and diesel, there is a high degree of uncertainty regarding retail prices. Following the above example of fuel prices at the pump, currently there are approximately 165,000 plus gasoline stations in the United States. However, there is not a public, centralized source in the United States that provides detailed transactional information (e.g., transaction volume of gasoline in gallons) on a location-by-location basis. As there can be numerous individual retailers in a geographic boundary, it remains difficult to accurately determine a retail commodity price within that geographic boundary on a location-by-location basis.

Further complicating the idea of pricing a commodity such as retail motor fuel is the uncertainty of how the price for a given gasoline station impacts the market within a geographic boundary. As a specific example, suppose a survey on station owners in the state of Texas indicates that, on average, each station has a storage capacity of 6,000 gallons of gasoline. Although this number may be useful for calculating an average fuel consumption, the disparity between prices at various gasoline stations coupled with the disparity of the amount of fuel each station sells at a given price is a poor estimate of the price per gallon of fuel sold within a geographic boundary.

One object of the embodiments disclosed herein is to provide a viable solution in determining a retail commodity price within a geographic boundary. This object is achieved by taking various inputs, including observed retail prices and actual transactional data, and creating an estimated local market retail price for a particular product based on those inputs. The geographic boundary can be specifically defined.

In one broad respect, the present disclosure is directed to a method for determining a retail commodity price within a geographic boundary by obtaining from a first source a retail price on a commodity at a plurality of locations within a geographic boundary, obtaining from a second source a retail price on the commodity at the plurality of locations within a geographic boundary, generating a composite retail price at each of the plurality of locations using the first source retail price and the second source retail price, and generating an aggregate composite price of the commodity within the geographical boundary using the composite retail price at each location within the geographic boundary. In some embodiments, the first source retail price comprises one or more of an observed price, a transactional price, a self-reported price, and a third party reported price. In some embodiments, the second source retail price comprises one or more of an observed price, a transactional price, a self-reported price, and a third party reported price. In some embodiments, generating a composite retail price at each location comprises comparing each observed price from an observer with observed prices received from other observers. In some embodiments, generating a composite retail price at each location comprises determining a confidence factor for each of the plurality of locations within the geographic boundary. In some embodiments, the method includes analyzing the first source or the second source based on one or more criteria associated therewith. In some embodiments, generating the aggregate composite price for the commodity within the geographical boundary comprises multiplying the composite retail price of the commodity for each of the plurality of locations within the geographic boundary by the amount of the commodity attributed to that location and dividing the product by the amount of the commodity attributed to the plurality of locations within the geographic boundary. In some embodiments, the amount of the commodity attributed to at least one of the plurality of locations within the geographic boundary is determined based on a volume proxy.

In another broad respect, the present disclosure is directed to a computer-readable medium carrying program instructions executable by a processor to obtain from a first source a retail price on a commodity at a plurality of locations within a geographic boundary, obtain from a second source a retail price on the commodity at the plurality of locations within a geographic boundary, generate a composite retail price at each of the plurality of locations using the first source retail price and the second source retail price and generate an aggregate composite price of the commodity within the geographical boundary using the composite retail price at each location within the geographic boundary. In some embodiments, the first source retail price comprises one or more of an observed price, a transactional price, a self-reported price, and a third party reported price. In some embodiments, the second source retail price comprises one or more of an observed price, a transactional price, a self-reported price, and a third party reported price. In some embodiments, the program instructions are further executable by the processor to compare each observed price from an observer with observed prices received from other observers. In some embodiments, the program instructions are further executable by the processor to determine a confidence factor for each of the plurality of locations within the geographic boundary. In some embodiments, the program instructions are further executable by the processor to perform evaluating each of the one or more sources based on one or more criteria associated therewith. In some embodiments, the program instructions are further executable by the processor to multiply the composite retail price for the commodity for each of the plurality of locations within the geographic boundary by the amount of the commodity attributed to that location and divide the product by the amount of the commodity attributed to the plurality of locations within the geographic boundary. In some embodiments, the program instructions are further executable by the processor to determine a volume proxy for at least one of the plurality of locations within the geographic boundary.

In another broad respect, the present disclosure is directed to a system having a processor and a computer-readable medium carrying program instructions executable by the processor to perform obtaining from a first source a retail price on a commodity at a plurality of locations within a geographic boundary, obtaining from a second source a retail price on the commodity at the plurality of locations within a geographic boundary, generating a composite retail price at each of the plurality of locations using the first source retail price and the second source retail price and generating an aggregate composite price of the commodity within the geographical boundary using the composite retail price at each location within the geographic boundary. In some embodiments, the first source retail price comprises one or more of an observed price, a transactional price, a self-reported price, and a third party reported price. In some embodiments, the second source retail price comprises one or more of an observed price, a transactional price, a self-reported price, and a third party reported price. In some embodiments, generating a composite retail price at each location comprises comparing each observed price from an observer with observed prices received from other observers. In some embodiments, the program instructions are further executable by the processor to perform determining a confidence factor for each of the plurality of locations within the geographic boundary. In some embodiments, the program instructions are further executable by the processor to perform multiplying the composite retail price for the commodity for each of the plurality of locations within the geographic boundary by the amount of the commodity attributed to that location and dividing the product by the amount of the commodity attributed to the plurality of locations within the geographic boundary. In some embodiments, the program instructions are further executable by the processor to determine a volume proxy for at least one of the plurality of locations within the geographic boundary.

In another respect, embodiments disclosed herein may include a method for determining a retail commodity price within a geographic boundary by obtaining from an observation source a retail price on a commodity at a plurality of locations within a geographic boundary, obtaining from a transaction source a retail price on the commodity at the plurality of locations within a geographic boundary, generating a composite retail price at each of the plurality of locations using the observation source retail price and the transaction source retail price, and generating an aggregate composite price of the commodity within the geographical boundary using the composite retail price at each location within the geographic boundary. In some embodiments, the method may include obtaining a self-reported retail price on the commodity at the plurality of locations within a geographic boundary, wherein generating a composite retail price at each of the plurality of locations uses the observation source retail price, the transaction source retail price and the self-reported price.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
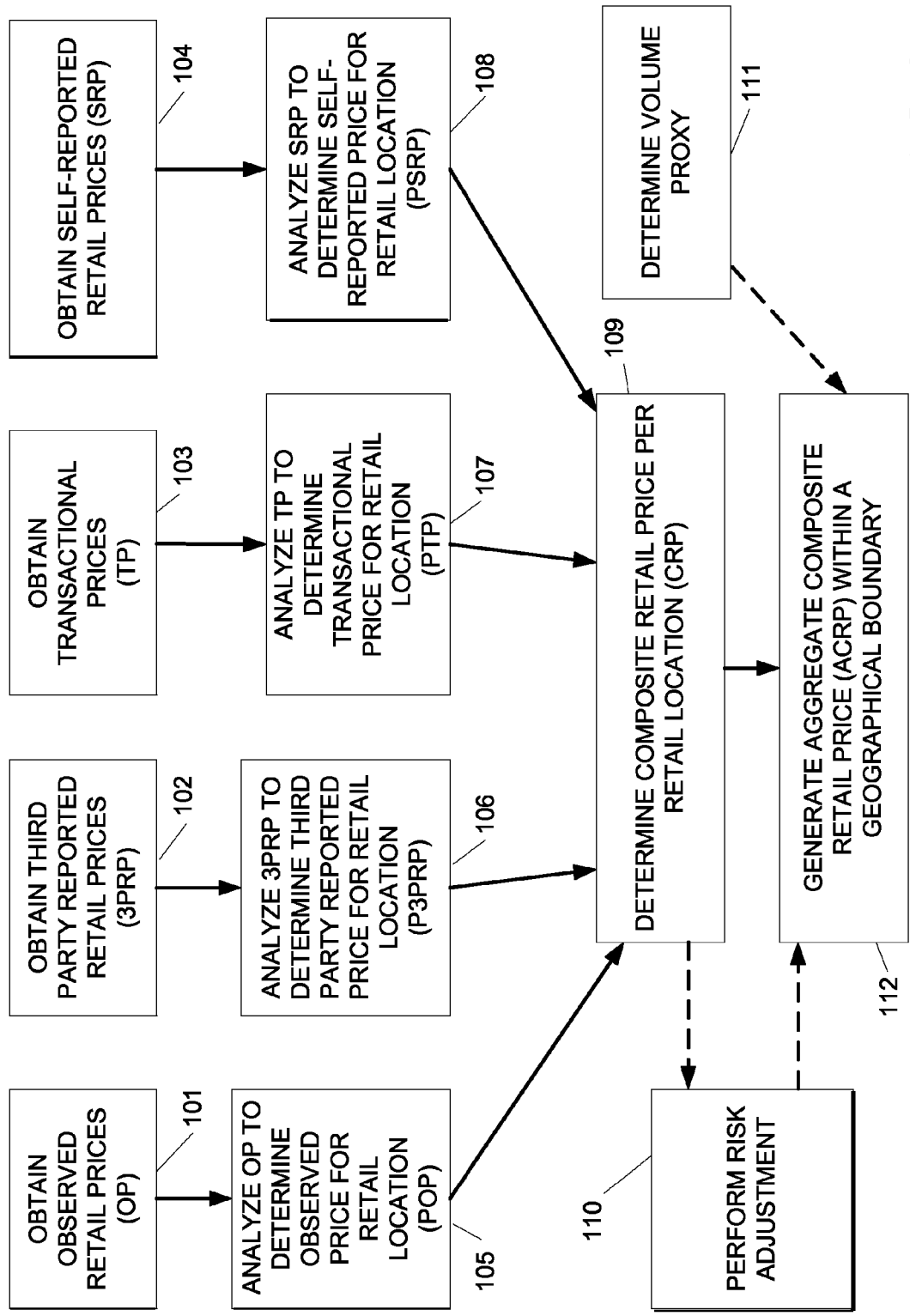
FIG. 1 depicts a flow diagram depicting an exemplary method for determining how the retail price of a commodity can be determined within a geographical boundary or a defined area or locale.

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Those skilled in the art should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

Before discussing specific embodiments, an exemplary hardware architecture for implementing certain embodiments is described. Specifically, one embodiment can include a computer communicatively coupled to a network (e.g., the Internet). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (e.g., mouse, trackball, stylist, etc.), or the like. In some embodiments, the computer has access to at least one database.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (e.g., non-volatile memories, volatile memories, DASD arrays, magnetic tapes, floppy diskettes, hard drives, optical storage devices, or any other appropriate computer-readable medium or storage device). In one exemplary embodiment of the invention, the computer-executable instructions may include lines of complied C++, Java, HTML, or any other programming or scripting code.

Additionally, the functions of the present disclosure may be implemented on one computer or shared/distributed among two or more computers in or across a network. Communications between computers implementing embodiments of the invention can be accomplished using any electronic, optical, radio frequency signals, or other suitable methods and tools of communication in compliance with known network protocols.

Attention is now directed to one exemplary process flow which addresses the determination of the retail price for a commodity in a market defined within a specific geographic boundary. A geographic boundary may be defined as a city, a borough, a county, a state, a country, a region, a zip code, or other predetermined area, or may be arbitrarily defined as a designated market area or DMA, etc.), or some combination or division.

In one embodiment, price information on local, location-by-location retail prices may gathered from multiple sources, including retail price observing services, transaction sources, self-reporting sources, and third-party sources. In one embodiment, the retail price information from each source may be analyzed individually to determine a confidence score. The analyzed price information may be analyzed algorithmically to generate a composite retail price for each location within a specific geographic boundary (i.e., a defined area). The composite retail prices for all the locations within the geographic boundary may be analyzed to determine an aggregate composite retail price for the commodity within the geographic boundary (also referred to as the Aggregate Composite Retail Price (ACRP)). The composite retail prices may be weighted or otherwise adjusted to determine a confidence factor for each location.

FIG. 1 depicts a flow diagram depicting an exemplary method for determining how a retail price can be determined for a commodity within a geographical boundary or a defined area or locale. In this example, the commodity refers to the energy related commodity retail motor fuel, which may be gasoline. Those skilled in the art will appreciate that the retail price for other retail commodities (e.g., diesel fuel, heating oil, jet fuel, emission credits) may be determined using embodiments disclosed herein.

At step 101, retail price information for a commodity may be gathered, received or otherwise obtained from various observation sources. Retail price information relating to motor fuel prices may include the price of gasoline or diesel, and may for example include price information on unleaded gasoline by octane level, ethanol content, etc. Types of observation sources may include public communities and proprietary communities. Examples of public communities include publicly accessible websites (e.g., GasBuddy.com, GasPriceWatch.com, etc.). Examples of proprietary communities may include those comprising purchasers or consumers of a price protection product, hereinafter referred to as the Pricelock community. Typically, the retail price for a given location is "observed" by an individual, who then enters the price information into a database, such as by accessing the GasBuddy.com website and following the website protocol. The GasBuddy.com observation sources provide retail gasoline prices reported by observers across the US and Canada. An observer is an individual who registers as a userfobserver of a community (e.g., via the community's website) and who reports actual retail prices of gasoline from locations that s/he personally visits or observes while driving past the gasoline station. Within this disclosure, retail price information obtained from observation sources may be referred to as "observed prices" (OP) Each observed price may be detailed and may contain real-time data (e.g., via a real-time data feed). One advantage to this source may be that individuals are constantly updating the price information, which may provide a dynamic database that is very current.

At step 102, retail price information for a commodity may be gathered, received or otherwise obtained from third-party price-reporting and aggregation communities, databases, websites, and businesses, and may be referred to as a Third-Party Reported Price (3PRP). For example, Skyline Products, which is an electronic signage company, provides a service in which the retail price of gasoline and diesel fuels for multiple locations may be controlled remotely. In some embodiments, third-party reported retail price information may be obtained from proprietary data aggregators such as Oil Price Information Service or OPIS, which is a leading fuel transaction data aggregator. One advantage to this type of source is that motor fuel retail price information for a large number of locations may be gathered at once, and may be gathered almost instantaneously.

At step 103, retail price information for a commodity may be gathered, received or otherwise obtained from various transaction sources. Within this disclosure, retail price information from transaction sources may be referred to as "transaction prices" (TP). These transaction prices are typically detailed and may contain real-time data (e.g., via a real-time data feed). Types of transaction price sources may include, but are not limited to:
  a. Private network and database(s) containing transactions from actual fuel purchases at the retail stations by station and fuel type;
  b. Third-party networks and databases (e.g., credit card companies);
  c. Fuel card providers;
  d. Fleet card providers (e.g., Wright Express or WEX);

At step 104, retail price information may be gathered, received or otherwise obtained from a company that publishes or otherwise self-reports its prices. Thus, for example, fuel price information for a retail location may be obtained directly from the company operating the retail location. Within this disclosure, retail price information from self-reporting sources may be referred to as "self-reported prices" (SRP). In some embodiments, SRP information for a commodity may be gathered by accessing a website provided by the company in which the company publishes retail prices for locations associated with the company. In some embodiments, the company may self-report retail price information by sending an email or telephoning the retail price information to a representative associated with the present disclosure. One advantage to this type of information may be that the information is updated regularly and contains fewer errors. Self-reported retail price information may include information reported from sources including, but not limited to:
  a. The owner or operator of a location within the geographic boundary;
  b. Oil companies (e.g., Exxon, Mobile, etc.);
  c. Regional networks of retail station owners (also referred to as "affinity partners") who may be affiliated with the operators of a price protection system. The affiliation may comprise an agreement between the operators of the price protection system and the location. For example, the agreement may stipulate that an affiliated retail location will provide a price discount to users of the price protection system, or provide an incentive or fee to the operators of the price protection system in exchange for the operator of a price protection system to "drive" traffic to their location. A provider may drive traffic through various mechanisms. For example, a provider may assign a more favorable weighting factor to affinity partners, promote affinity partners in web advertising, provide fuel discounts to consumers who visit the affinity partners, etc.

At step 105, the observed price information may be analyzed using criteria associated with the observation source to select a "Pricelock Observed Price" (POP) for each location. In some embodiments, analyzing the observed price information may include examining the observed price information to determine the most recent observed price for each location. If the most recent observed price is determined to be correct, the most recent observed price may be the retail price. In some embodiments, the gathered observed prices for a given location may be compared to historical observed prices for the same location to determine whether an observed price is within a predefined tolerance. In some embodiments, an individual tolerance is computed only if there is a historical observed price available within a certain timeframe (e.g., seven days). In some embodiments, an observed price is removed from consideration if it is determined to be outside the tolerance. The observed price may be analyzed to ensure the price information was properly entered by the observer (the decimal point was in the correct place, numbers were not transposed, etc). In some embodiments, if no historical observed price is available, then the most recent observed price may be chosen. In some embodiments, if multiple observed prices are available for a particular retail location, the most recent observed retail price by fuel type will be chosen provided that the information is within a predetermined tolerance, is verifiable for correctness, (e.g., numbers are not transposed, decimal point not omitted, etc), was obtained within a certain time frame (e.g., less than 1 hour, less than 24 hours, less than 7 days, etc.) or meets other price observation criteria. In some embodiments, an observed price may be determined for each observation data source (e.g., GasBuddy.com, GasPriceWatch.com), by fuel type and station. In some embodiments, the price information from all the observation sources may be analyzed and compared with other observed price information to determine the composite retail price per retail location and fuel type.

At step 106, the obtained third-party price information may be analyzed based on criteria associated with the third party source to determine a retail price, which may be referred to as a "Pricelock Third-Party Reported Price" (P3PRP). In some embodiments, the price information reported by the third party may be analyzed to ensure the retail price is for a location within the geographic boundary, the price is within a predetermined tolerance, was reported within a timeframe, or other criteria.

At step 107, the transactional price information may be analyzed based on criteria associated with the source to select a retail price, which may be referred to as a "Pricelock Transaction Price" (PTP) for each location. In some embodiments, the information may be analyzed to ensure the price information does not represent a special price, a rebate, or other price unrepresentative of the retail price per unit for the location. In some embodiments, the transaction prices are analyzed to select a "Pricelock Transaction Price" (PTP) on a predefined unit-by-unit basis (e.g., location-by-location, county-by-county, DMA by DMA, etc.). As an example, step 107 may involve selecting the most recent transaction price. In the case of retail motor fuels, the most important criterion for determining the PTP of retail motor fuel may be the age of the transaction price. Thus, in this example, once the transaction data is aggregated, by fuel type and station location, from various transaction sources, the most recent transaction price is chosen, provided that it is within a predefined tolerance. In some embodiments, the transaction price information for each location may be analyzed to determine whether the most recent transaction price is within a predefined price tolerance. For example, the most recent transaction price, by fuel type and location, from all sources, may be compared to the next most recent transaction from the same data source, to determine if the price is within price tolerance from the previous transaction. The price tolerance may be a percentage, such as plus or minus 10%, or may be a value, such as plus or minus 10 cents. If it is, then this price is chosen, provided that it clears an error checking algorithm, such as described below. In one embodiment, any transaction price that is outside the defined tolerance is flagged as a possible outlier and run through an error checking algorithm described below.

In step 108, the self-reported price information may be analyzed based on criteria associated with the source to determine a retail price, which may be referred to as a "Pricelock Self-Reported Price" (PSRP), for each location. In some embodiments, the information may be analyzed to ensure the price information does not represent a special price, a rebate, or other price unrepresentative of the retail price per gallon for the location. Other criteria may be used to ensure the price information is relevant, timely, reliable, error-free, within the geographic boundary, etc.

At step 108, the self-reported price information may be analyzed to select a Pricelock Self-Reported Price (PSRP) for a location. In some embodiments, the information may be analyzed to ensure the retail price information does not represent a special price. For example, if a retail location sends out an email offering a limited amount of fuel at a lower-than-normal price, this should be considered. As another example, a company may self-report only motor fuel prices at selected locations because the retail price is lower than competitors' prices, but might not self-report for locations with higher prices.

In some embodiments, an error checking analysis may be performed on all price information. Specifically, data points may be reviewed and outlier data point(s) may be removed to protect against known data reporting errors. In this example, fuel types at the retail stations may be recognized by product codes assigned to all fuel types and to individual retail products within the retail convenience stores. In one embodiment, product codes may be unique identifying codes similar to SKUs. It might be possible that the product codes are assigned in error, incorrectly identifying a fuel type. To prevent this, in one embodiment, each retail price by station, data source and fuel type, may be compared against at least three criteria. The retail price may be compared to the most recent retail prices for the same fuel type and data source from other nearby stations (e.g., within a 3-mile trade area). If the retail price varies by more than the standard deviation of these other stations, it may be flagged as a potential outlier. The retail price may be compared against the most recent retail price of the next highest grade of fuel, from the same data source and same station. If the retail price of the next highest grade is less than the price in question, then the retail price may be discarded as an outlier. If not, then the comparison may be against the most recent retail price, by same fuel type and location of other data sources. If the retail price in question is different from the retail price of the other data sources, it may be discarded. For example, a price may be 10% higher than other prices. If a retail price is discarded, then it may be flagged for station follow-up by Pricelock analysts to notify the retail station of the possibility of a product code error. Additionally, if a retail price is discarded, a new retail price may be determined and an error checking analysis may be restarted.

As one skilled in the art can appreciate, the steps described above can be implemented in many ways without departing from the spirit and scope of the invention disclosed herein. For example, as motor fuel prices may change dynamically and continuously, one or more mathematical functions such as interpolation may be performed on the collected data, for example the observed prices. It is also possible to limit the scope of input data and/or the number or type of observation sources. For example, in some embodiments, observed retail prices may be limited to only the Pricelock community observers or only observed prices from GasBuddy.com and GasPriceWatch.com. Furthermore, a tag, timestamp, weighting factor, or the like may be assigned to a price, fuel type, and/or station location to manipulate the analysis for a particular application. As one skilled in the art can appreciate, the steps described above can be implemented in many ways without departing from the spirit and scope of the disclosure disclosed herein. For example, a tag, timestamp, weighting factor, or the like may be assigned to the Pricelock Transaction Price or PTP.

At step 109, the observed price, transactional price, self-reported price, and third-party reported price may be algorithmically analyzed to determine the "Composite Retail Price" (CRP) on a location-by-location basis. In some embodiments, step 109 may involve generating a Confidence Factor (CF) for each retail price obtained from each source. The CF thus generated can reflect the reliability of the retail price for each source for a specific location. In one embodiment, the CF may be determined through an algorithm that considers the following criteria: frequency and volume of price reporting by observers and transactions for a particular fuel type and location, stations identified with possible product coding errors, historical price volatility, current motor fuel price trends (contango or backwardation) on wholesale, rack and retail prices. As used herein, a contango price trend refers generally to an upward sloping forward curve, whereas a backwardation price trend refers generally to a downward sloping forward curve. A CF may be determined for each POP, P3PRP, PSRP and PTP for each station and fuel type. For example, a station with infrequent observation price reporting, in a highly volatile motor fuel price market, may have a low CF assigned to the POP. Once the Confidence Factors are assigned to one or more of the POP, P3PRP, PSRP and PTP, the Composite Retail Price (CRP) may be determined through an algorithm that compares the Confidence Factors for each according to the amount of disparity. For example, if the Pricelock Observed Price (POP) for a particular station and fuel type is more recent than the Pricelock Transaction Price (PTP), but is determined to be less reliable or potentially inaccurate through a determined "confidence factor", then the Composite Retail Price (CRP) may be weighted closer to the PTP than the PSP. In some embodiments, the third-party reported price may be weighted more because it represents an independent source. As another example, if the POP CF is determined to be 67%, the P3PRP is determined to be 72%, the PSRP is determined to be 80%, and the PTP is determined to be 85%, the CRP may be weighted towards the PTP. Again, in this example, the CRP is the composite retail price by station and by fuel type.

In step 110, each location within the geographic boundary may be evaluated and a risk adjustment may or may not be performed on the CRP for the location, depending upon the statistical confidence of risk. More specifically, at step 110, in response to an evaluation of the location, the CRP can be risk-adjusted based on the determined POP CF. For example, a confidence factor may be lower for a location because the prices have been lowered to lure customers to a new store or because traffic is light, or the price information for an older store may have a higher confidence factor because the price information can be compared with historical price information for that location, etc.

As an example, suppose two risk factors or variables are to be considered on a location-by-location basis: years in operation (Age) and volume of transaction (Vol). Each variable may be assigned or otherwise associated with a particular weighting factor (W) (e.g., W1 for Age, W2 for Vol, etc.). Thus, in this example, a confidence factor formula below may be applied to each station (i):

Confidence Factor $(Station_i) = [(Age_i * W1) + (Vol_i * W2)]$.

Other factors may include the number of competitors within a specified distance, independent vs. franchise, location, services available, car wash facilities, full service operations, nearby businesses, restaurants, shopping centers, etc. The factors may be determined by direct methods, such as polling observers, and may be indirectly gleaned, such as by comparing transaction data from different credit card companies for the same period In one embodiment, each CRP within a defined geographic area is risk adjusted. For example, if an evaluation of a location results in a CF of 65%, a risk premium can be added to the CRP to compensate for the risk associated with the location. A CF of 95% may result in little or no risk premium addition. All CRPs in that defined geographic area are then aggregated to determine a local, regional or national Aggregate Composite Retail Price (ACRP).

At step 112, an Aggregate Composite Retail Price (ACRP) may be determined by applying a weighted formula to the location-by-location composite prices (i.e., CRPS) within a geographic region or boundary (e.g., Travis County).

This step involves determining a local, regional or national ACRP based upon the aggregation of the various CRPs, perhaps risk-adjusted in step 109, within a defined geographical area.

To generate the ACRP for the locations within a geographic boundary, an algorithm implementing one embodiment may consider various criteria associated with the locations within the defined geographical boundaries. In one embodiment, the ACRP within a defined geographic boundary (e.g., a county, state, DMA, country, etc.) may be based on a weighted formula, which may be determined by the sum of the sales volume of the commodity at each location times the price at each location over the total sales volume at all the locations within that defined geographic boundary. Thus, a formula for determining the ACRP within a geographic boundary may be defined as follows:

$$ACRP = [(CRP_1 * SV_1 + CRP_2 * SV_2 + \ldots + CRP_n * SV_n) / (SV_1 + SV_2 + \ldots SV_n)],$$

where $SV_1$ represents the Sales Volume for a first location, $SV_2$ represents the Sales Volume for a second location, and n represents the total number of locations within the geographic boundary. Similarly, $CRP_1$ represents the Composite Retail Price for a first location, $CRP_2$ represents the Composite Retail Price for a second location, etc.

For example, the volume of purchases, by fuel type, at an individual station may attribute more weight to that particular retail price. The volume data can be reported or otherwise provided by transaction sources as described above. As an example, suppose that the defined geographic area is a specific county which contains 400 individual gasoline stations. Within these 400 stations, 80% of the total volume of motor fuel purchases, by fuel type, occurs at 100 stations As another example, the confidence factors built into the CRPs from each station may associate more weight to the retail price for a particular location. Following the above example, the CRPs at these 100 stations may also have higher confidence factors due to the frequency of observed and transactional prices. The ACRP may be calculated by weighting prices at these 100 stations more than prices of the other 300 stations due to lower volumes and potentially reduced levels of statistical confidence. All of this data can be useful in determining how to push traffic to affinity partners and/or preferred providers.

In embodiments where a weighted formula is used in determining the ACRP, the volume of commodity sold at each location in the same defined geographic area may be critical to determine an aggregate composite retail price within the geographic boundary. For example, according to the National Association of Convenience Stores, each retail gasoline station throughput in the United States can vary from about 30,000 gallons per month at the low end up to 100,000 gallons per month at the high end (i.e., roughly from about 1,000 gallons per day to about 3,000 gallons per day). Similarly, the average refueling period may be three days. If the average refuel rate was used, the daily volume (fuel usage) proxy for each gasoline station in Texas would be the average storage capacity 6,000-gallon divided by the refuel rate of 3 days, or 2000 gallons/day, which would mean each location sold about 60,000 gallons per month. However, using this process may erroneously downplay the impact of a location selling 100,000 gallons/month, and may erroneously overstate the impact of a location selling 30,000 gallons/month. By determining the volume of commodity sold at each location and an associated composite retail price for that location, an accurate assessment of the aggregate composite retail price for the commodity may be determined.

Figure 2:
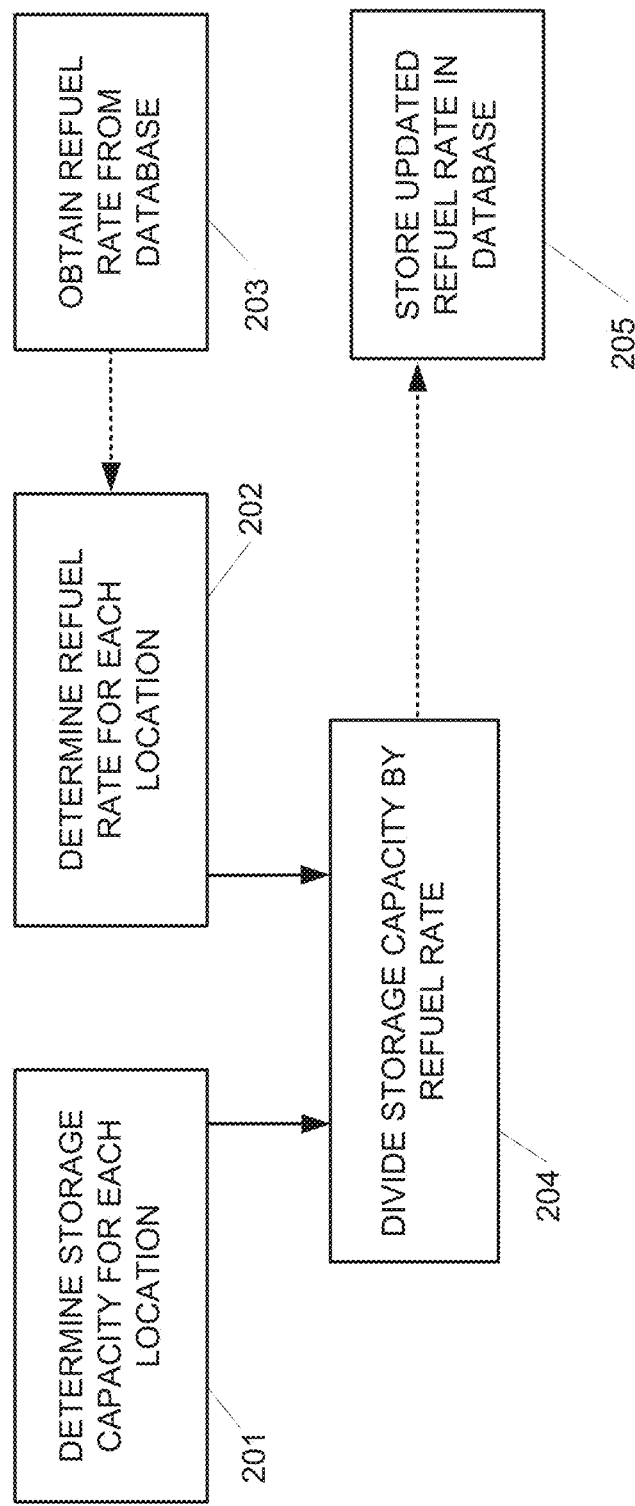
FIG. 2 depicts a flow chart illustrating one embodiment of a process of how the daily volume proxy for a commodity can be obtained.

In some cases, the volume data for a particular location might not be readily available. For example, it can be difficult if not impossible to find a public, centralized source for volume information on a location-by-location basis within a defined geographic area, perhaps depending upon how that geographic area is defined. Moreover, it may not be possible to obtain complete transaction data, including the volume data, from all locations in a defined geographic area. Even if all locations had agreed to provide complete transaction data, it may not be possible for them to do so at the same time or within a given time frame. Similarly, not all observers may report the volume data associated with the observed prices and thus the volume data for the observed prices may be missing or incomplete for the defined geographic area. A third-party source may also have incomplete or missing data regarding volume. To address this issue and further enhance data quality, in some embodiments, in step 111, a volume proxy can be determined for a location and used in absence of actual volume data as input to the above-described process of determining the ACRP. In some embodiments, a method of determining an aggregate composite retail price within a geographic boundary as described above with reference to FIG. 1 may further comprise performing the following steps for each retailer within that geographic boundary, including determining its storage capacity on a location-by-location basis, determining its refuel rate or tank usage rate, and dividing the storage capacity by the refuel rate to get the daily volume proxy (estimate usage volume) per retailer. In this way, the ACRP can be calculated using a weighted formula even if some input data may be incomplete or imperfect, thereby making embodiments of the system and method disclosed herein more robust. Using an estimated volume as a proxy for the actual volume on a location-by-location basis to proximate the transaction volume by location can be particularly useful in the context of observed prices as the volume of the transactions may not be known or reported by observers. In some embodiments, a volume proxy can be determined by first surveying retail locations via retailers, managers, etc. in a defined geographic area to determine the daily volume capacity. If the refueling period can be determined for a particular retail location, a volume proxy may be determined for the retail location. FIG. 2 is a flow chart illustrating in one embodiment a process of how the daily volume proxy can be obtained.

In step 201, the storage capacity for each retail location may be determined. For example, currently all retail motor fuel locations are required to disclose the storage capacity of each underground storage tank to environmental protection agencies with state agencies and with the federal U.S. Environmental Protection Agency. In some embodiments, the storage capacity for a given retail location may be obtained by researching government documents, such as filings with the EPA or other regulatory agency. In some embodiments, the storage capacity for a given retail location may be obtained by collecting information from observers, such as by having observers input the number of pumps or asking the owner/operator of the retail location. In some embodiments, a third-party source, such as NACS or OPIS may have information regarding the storage capacity for retail locations. Once the storage capacity for a retail location has been determined, the information may be stored in a database for future reference. In some embodiments, in step 203, the storage capacity for one or more retail locations within a geographic boundary may be obtained from the database. One embodiment comprises a proprietary database containing data on storage capacities for every retail motor fuel station in the United States. As an example, the proprietary database may contain information on about 165,000 or more retail fuel stations in the United States. In some embodiments, the number of pumps may be used as a basis for stating the storage capacity of a retail fuel location.

In step 202, the refuel rate for a retail location may be determined. In one embodiment, the step of determining the refuel rate comprises accessing or sending a request to a central database, perhaps over a network, and obtaining from the central database refuel rate information for retailers within the defined geographic boundary. In one embodiment, the estimated daily volume proxy data may also be stored in the central database, such that, in step 203, the refuel rate for a retail fuel location may be retrieved from the database and compared with information provided by one or more sources.

In step 204, a proprietary estimate of daily volume at a retail fuel station, store, or location can be calculated by dividing its storage capacity in gallons by its refueling period. In one embodiment, the daily volume is adjusted by some factors, such as a savings stock factor.

In step 205, the results may be stored in a database, such that future calculations of a volume proxy may have a higher confidence factor.

In some embodiments, the CRP for locations within a geographic boundary may be made available for individual consumers or fleet managers. In some embodiments, the CRP, the sales volume, and/or the daily volume proxy can be an input for creating an index price. In some embodiments, the aggregate composite retail price for locations within a geographic boundary may be used to determine a strike price for a financial institution. In some embodiments, a retail commodity price may be settled against a published national price index under a price protection contract. Examples of settling under price protection against the pump price as well as settling against an index can be found in U.S. patent application Ser. No. 11/705,571, filed Feb. 12, 2007, entitled "METHOD AND SYSTEM FOR PROVIDING PRICE PROTECTION FOR COMMODITY PURCHASING THROUGH PRICE PROTECTION CONTRACTS" and Provisional Patent Application No. 60/1922,427, filed Apr. 9, 2008, entitled "SYSTEM AND METHOD FOR INDEX BASED SETTLEMENT UNDER PRICE PROTECTION," both of which are incorporated herein as if set forth in full.

In the foregoing specification, the invention has been described with reference to specific embodiments. However, one of ordinary skill in the art will appreciate that various modifications and changes can be made without departing from the spirit and scope of the invention disclosed herein. Accordingly, the specification and figures disclosed herein are to be regarded in an illustrative rather than a restrictive sense, and all such modifications are intended to be included within the scope of the invention.

We claim:

1. A method for calculating a retail commodity price within a geographic boundary, comprising:
   obtaining from one or more observation sources communicatively connected to a computer system on a network, observed retail prices (OP) on a commodity at each location of a plurality of locations within the geographic boundary;

obtaining from one or more third-party price-reporting sources communicatively connected to the computer system on the network, third-party reported retail prices (3PRP) on the commodity at the each location of the plurality of locations within the geographic boundary;

obtaining from one or more transaction sources communicatively connected to the computer system on the network, transaction prices (TP) on the commodity at the each location of the plurality of locations within the geographic boundary;

obtaining from one or more self-reporting sources communicatively connected to the computer system on the network, self-reported prices (SRP) on the commodity at the each location of the plurality of locations within the geographic boundary;

analyzing, by the computer system on the network, the OP to determine an analyzed OP for the commodity at the each location of the plurality of locations within the geographic boundary, wherein the analyzing the OP comprises at least one of selecting a price based on recency, checking if a price falls within a price tolerance, checking a price for data entry errors, determining if a price falls within a particular time frame, determining if a price is an outlier data value, and/or checking the consistency of a price with a price from another data source;

analyzing, by the computer system on the network, the 3PRP to determine an analyzed 3PRP for the commodity at the each location of the plurality of locations within the geographic boundary, wherein the analyzing the 3PRP comprises at least one of determining if a price falls within a price tolerance, determining if a price falls within a particular time frame, determining if a price is an outlier data value, and/or checking the consistency of a price with a price from another data source;

analyzing, by the computer system on the network, the TP to determine an analyzed TP for the commodity at the each location of the plurality of locations within the geographic boundary, wherein the analyzing the TP comprises at least one of determining if a price is representative of the regular price for a location, selecting a price based on recency, determining if a price falls within a price tolerance, determining if a price is an outlier data value, and/or checking the consistency of a price with a price from another data source;

analyzing, by the computer system on the network, the SRP for the commodity at the each location of the plurality of locations within the geographic boundary, wherein the analyzing the SRP comprises at least one of determining if a price is representative of the regular price for a location, determining if a company is fully reporting the prices at its locations, determining if a price is an outlier data value, and/or checking the consistency of a price with a price from another data source;

determining, by the computer system on the network, a confidence factor for each of the analyzed OP, the analyzed 3PRP, the analyzed TP, and the analyzed SRP for the each location, wherein the confidence factor is based on one or more of: frequency of price reporting, volume of price reporting, stations identified with possible product coding errors, historical price volatility, current motor fuel price trends, if a price is representative of the regular price for a location, the amount of time in business of a location, traffic near a location, volume of a transaction at a location, number of competitors within a specified distance of a location, whether a location is independent or a franchise, geographic location of a location, services available at a location, the presence of car wash facilities at a location, the presence of full service operations at a location, businesses nearby a location, restaurants near a location, and/or shopping centers near a location;

generating, by the computer system on the network on a location-by-location basis, a composite retail price for the commodity at the each location of the plurality of locations within the geographic boundary based on the analyzed OP, the analyzed 3PRP, the analyzed TP, the analyzed SRP, and all of their corresponding confidence factors; and generating, by the computer system on the network, an aggregate composite retail price of the commodity for the geographic boundary based on the composite retail price for the commodity at the each location of the plurality of locations within the geographic boundary.

2. The method of claim 1, wherein the OP, 3PRP, TP, and SRP obtained by the computer system fall within a particular time frame.

3. The method of claim 1, wherein the analyzing the OP, 3PRP, TP, and SRP comprises determining if one or more of the OP, 3PRP, TP, and SRP for the commodity at the each location of the plurality of locations within the geographic boundary fall within a price tolerance.

4. The method of claim 1, further comprising adding a risk premium to the composite retail price for the commodity at a particular location to compensate for a risk associated with the particular location within the geographic boundary.

5. The method of claim 1, wherein the aggregate composite retail price of the commodity for within the geographic boundary is determined based on [a sum of (individual composite retail prices times corresponding individual sales volumes of the commodity at individual locations)] divided by a total sales volume of the commodity within the geographic boundary.

6. The method of claim 5, wherein the corresponding individual sales volume of the commodity at an individual location is calculated by performing the steps of:
determining a storage capacity for the individual location;
determining a refuel rate for the individual location; and
dividing the storage capacity for the individual location by the refuel rate for the individual location.

7. A non-transitory computer-readable medium storing program instructions executable by a computer system to perform the steps comprising:
obtaining from one or more observation sources communicatively connected to the computer system on a network, observed retail prices (OP) on a commodity at each location of a plurality of locations within a geographic boundary;

obtaining from one or more third-party price-reporting sources communicatively connected to the computer system on the network, third-party reported retail prices (3PRP) on the commodity at the each location of the plurality of locations within the geographic boundary;

obtaining from one or more transaction sources communicatively connected to the computer system on the network, transaction prices (TP) on the commodity at the each location of the plurality of locations within the geographic boundary;

obtaining from one or more self-reporting sources communicatively connected to the computer system on the network, self-reported prices (SRP) on the commodity at the each location of the plurality of locations within the geographic boundary;

analyzing, by the computer system on the network, the OP to determine an analyzed OP for the commodity at the each location of the plurality of locations within the geographic boundary, wherein the analyzing the OP comprises at least one of selecting a price based on recency, determining if a price falls within a price tolerance, checking a price for data entry errors, determining if a price falls within a particular time frame, determining if a price is an outlier data value, and/or checking the consistency of a price with a price from another data source;

analyzing, by the computer system on the network, the 3PRP to determine an analyzed 3PRP for the commodity at the each location of the plurality of locations within the geographic boundary, wherein the analyzing the 3PRP comprises at least one of determining if a price falls within a price tolerance, determining if a price falls within a particular time frame, determining if a price is an outlier data value, and/or checking the consistency of a price with a price from another data source;

analyzing, by the computer system on the network, the TP to determine an analyzed TP for the commodity at the each location of the plurality of locations within the geographic boundary, wherein the analyzing the TP comprises at least one of determining if a price is representative of the regular price for a location, selecting a price based on recency, determining if a price falls within a price tolerance, determining if a price is an outlier data value, and/or checking the consistency of a price with a price from another data source;

analyzing, by the computer system on the network, the SRP for the commodity at the each location of the plurality of locations within the geographic boundary, wherein the analyzing the SRP comprises at least one of determining if a price is representative of the regular price for a location, determining if a company is fully reporting the prices at its locations, determining if a price is an outlier data value, and/or checking the consistency of a price with a price from another data source;

determining, by the computer system on the network, a confidence factor for each of the analyzed OP, the analyzed 3PRP, the analyzed TP, and the analyzed SRP for the each location, wherein the confidence factor is based on one or more of: frequency of price reporting, volume of price reporting, stations identified with possible product coding errors, historical price volatility, current motor fuel price trends, if a price is representative of the regular price for a location, the amount of time in business of a location, traffic near a location, volume of a transaction at a location, number of competitors within a specified distance of a location, whether a location is independent or a franchise, geographic location of a location, services available at a location, the presence of car wash facilities at a location, the presence of full service operations at a location, businesses nearby a location, restaurants near a location, and/or shopping centers near a location;

generating, by the computer system on the network on a location-by-location basis, a composite retail price for the commodity at the each location of the plurality of locations within the geographic boundary based on the analyzed OP, the analyzed 3PRP, the analyzed TP, the analyzed SRP, and all of their corresponding confidence factors; and generating, by the computer system on the network, an aggregate composite retail price of the commodity for the geographic boundary based on the composite retail price for the commodity at the each location of the plurality of locations within the geographic boundary.

8. The non-transitory computer-readable medium of claim 7, wherein the OP, 3PRP, TP, and SRP obtained by the computer system fall within a particular time frame.

9. The non-transitory computer-readable medium of claim 7, wherein the analyzing the OP, 3PRP, TP, and SRP comprises determining if one or more of the OP, 3PRP, TP, and SRP for the commodity at the each location of the plurality of locations within the geographic boundary fall within a price tolerance.

10. The non-transitory computer-readable medium of claim 7, wherein the program instructions are executable by the computer system to perform:
adding a risk premium to the composite retail price for the commodity at a particular location to compensate for a risk associated with the particular location within the geographic boundary.

11. The non-transitory computer-readable medium of claim 7, wherein the aggregate composite retail price of the commodity for within the geographic boundary is determined based on [a sum of (individual composite retail prices times corresponding individual sales volumes of the commodity at individual locations)] divided by a total sales volume of the commodity within the geographic boundary.

12. The non-transitory computer-readable medium of claim 11, wherein the program instructions are executable by the computer system to perform:
determining a storage capacity for a location within the geographic boundary;
determining a refuel rate for the location; and
dividing the storage capacity for the location by the refuel rate for the location to determine a volume proxy for the location.

13. A computer system comprising:
a processor; and
a computer-readable medium storing program instructions executable by the computer system to perform the steps comprising:
obtaining from one or more observation sources communicatively connected to the computer system on a network, observed retail prices (OP) on a commodity at each location of a plurality of locations within a geographic boundary;
obtaining from one or more third-party price-reporting sources communicatively connected to the computer system on the network, third-party reported retail prices (3PRP) on the commodity at the each location of the plurality of locations within the geographic boundary;
obtaining from one or more transaction sources communicatively connected to the computer system on the network, transaction prices (TP) on the commodity at the each location of the plurality of locations within the geographic boundary;
obtaining from one or more self-reporting sources communicatively connected to the computer system on the network, self-reported prices (SRP) on the commodity at the each location of the plurality of locations within the geographic boundary;
analyzing, by the computer system on the network, the OP to determine an analyzed OP for the commodity at the each location of the plurality of locations within the geographic boundary, wherein the analyzing the OP comprises at least one of selecting a price based on recency, determining if a price falls within a price tolerance, checking a price for data entry errors, determining if a price falls within a particular time frame, determining if a price is an outlier data value, and/or checking the consistency of a price with a price from another data source;

analyzing, by the computer system on the network, the 3PRP to determine an analyzed 3PRP for the commodity at the each location of the plurality of locations within the geographic boundary, wherein the analyzing the 3PRP comprises at least one of determining if a price falls within a price tolerance, determining if a price falls within a particular time frame, determining if a price is an outlier data value, and/or checking the consistency of a price with a price from another data source;

analyzing, by the computer system on the network, the TP to determine an analyzed TP for the commodity at the each location of the plurality of locations within the geographic boundary, wherein the analyzing the TP comprises at least one of determining if a price is representative of the regular price for a location, selecting a price based on recency, determining if a price falls within a price tolerance, determining if a price is an outlier data value, and/or checking the consistency of a price with a price from another data source;

analyzing, by the computer system on the network, the SRP for the commodity at the each location of the plurality of locations within the geographic boundary, wherein the analyzing the SRP comprises at least one of determining if a price is representative of the regular price for a location, determining if a company is fully reporting the prices at its locations, determining if a price is an outlier data value, and/or checking the consistency of a price with a price from another data source;

determining, by the computer system on the network, a confidence factor for each of the analyzed OP, the analyzed 3PRP, the analyzed TP, and the analyzed SRP for the each location, wherein the confidence factor is based on one or more of: frequency of price reporting, volume of price reporting, stations identified with possible product coding errors, historical price volatility, current motor fuel price trends, if a price is representative of the regular price for a location, the amount of time in business of a location, traffic near a location, volume of a transaction at a location, number of competitors within a specified distance of a location, whether a location is independent or a franchise, geographic location of a location, services available at a location, the presence of car wash facilities at a location, the presence of full service operations at a location, businesses nearby a location, restaurants near a location, and/or shopping centers near a location;

generating, by the computer system on the network on a location-by-location basis, a composite retail price for the commodity at the each location of the plurality of locations within the geographic boundary based on the analyzed OP, the analyzed 3PRP, the analyzed TP, the analyzed SRP, and all of their corresponding confidence factors; and generating, by the computer system on the network, an aggregate composite retail price of the commodity for the geographic boundary based on the composite retail price for the commodity at the each location of the plurality of locations within the geographic boundary.

14. The system of claim 13, wherein the OP, 3PRP, TP, and SRP obtained by the computer system fall within a particular time frame.

15. The system of claim 13, wherein the analyzing the OP, 3PRP, TP, and SRP comprises determining if one or more of the OP, 3PRP, TP, and SRP for the commodity at the each location of the plurality of locations within the geographic boundary fall within a specified price tolerance.

16. The system of claim 13, wherein the program instructions are executable by the processor to perform:
adding a risk premium to the composite retail price for the commodity at a particular location to compensate for a risk associated with the particular location within the geographic boundary.

17. The system of claim 13, wherein the aggregate composite retail price of the commodity for within the geographic boundary is determined based on [a sum of (individual composite retail prices times corresponding individual sales volumes of the commodity at individual locations)] divided by a total sales volume of the commodity within the geographic boundary.

18. The system of claim 17, wherein the program instructions are executable by the processor to perform:
determining a storage capacity for a location within the geographic boundary;
determining a refuel rate for the location; and
dividing the storage capacity for the location by the refuel rate for the location.

19. The system of claim 18, wherein a result from the dividing the storage capacity for the location by the refuel rate for the location is used as a volume proxy for the location.

* * * * *

UNITED STATES PATENT AND TRADEMARK OFFICE
CERTIFICATE OF CORRECTION

PATENT NO. : 8,538,795 B2
APPLICATION NO. : 12/030119
DATED : September 17, 2013
INVENTOR(S) : Fell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 459 days.

Signed and Sealed this
Tenth Day of February, 2015

Michelle K. Lee
*Deputy Director of the United States Patent and Trademark Office*